(12) United States Patent
Hasuda et al.

(10) Patent No.: US 6,389,235 B1
(45) Date of Patent: *May 14, 2002

(54) CAMERA HAVING THE CAPABILITY TO DETECT AND DISPLAY INSUFFICIENT SHUTTER SPEED

(75) Inventors: Masanori Hasuda, Yokohama; Tetsuro Goto, Funabashi; Akira Katayama, Koganei, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/711,312

(22) Filed: Sep. 3, 1996

Related U.S. Application Data

(63) Continuation of application No. 08/350,053, filed on Nov. 29, 1994, now abandoned.

(30) Foreign Application Priority Data

Nov. 29, 1993 (JP) ............................................. 5-323182

(51) Int. Cl.$^7$ ........................... G03B 7/08; G03B 7/083; G03B 7/089; G03B 7/093
(52) U.S. Cl. ........................................ 396/231; 396/249
(58) Field of Search ............................. 354/234.1, 450, 354/464, 64, 267, 271.1, 273, 435, 456, 457, 443, 226, 227.1; 73/5; 396/263, 264, 457, 472, 493, 249, 231, 236, 455

(56) References Cited

U.S. PATENT DOCUMENTS

| | | | | |
|---|---|---|---|---|
| 3,913,376 A | * | 10/1975 | Scott | 324/186 |
| 4,453,811 A | * | 6/1984 | Yamasaki | 396/238 |
| 4,907,027 A | * | 3/1990 | Kobe et al. | 354/435 |
| 5,041,865 A | * | 8/1991 | Asano et al. | 354/299 |
| 5,134,435 A | * | 7/1992 | Tsuboi et al. | 354/435 |
| 5,181,064 A | * | 1/1993 | Tagami et al. | 354/432 |
| 5,220,376 A | * | 6/1993 | Tagami et al. | 396/236 |
| 5,257,056 A | * | 10/1993 | Kazumi | 351/234.1 |
| 5,365,290 A | * | 11/1994 | Suzuki et al. | 354/64 |
| 5,389,984 A | * | 2/1995 | Loughheim | 354/267.1 |
| 5,457,514 A | * | 10/1995 | Hasuda et al. | 354/431 |
| 5,815,745 A | * | 9/1998 | Ohsawa | 396/76 |
| 5,835,800 A | * | 11/1998 | Goto et al. | 396/236 |

* cited by examiner

Primary Examiner—Christopher E. Mahoney

(57) ABSTRACT

A camera includes a shutter unit for limiting the exposure time to a record medium, a shutter time setting unit for setting the shutter time of the shutter unit, a shutter drive and control unit for driving and controlling the shutter unit, a shutter condition detecting unit for detecting the condition of the shutter unit, a manifesting unit for manifesting the result detected by the shutter condition detecting unit, a manifestation control unit for driving and controlling the manifesting unit and a memory unit for previously storing inherent data to detect with the shutter condition detecting unit whereby a photographer is informed of the fact that the detection accuracy of the detecting element is insufficient for a shutter time, thus dealing with the situation. The manifestation control unit drives the shutter condition detecting unit, based on a shutter time set by the shutter time setting unit and inherent data stored in the memory unit, thus notifying the shutter condition detecting unit of the result.

3 Claims, 14 Drawing Sheets

FIG. 13

| | | |
|---|---|---|
| ▶ SET SHT SP | : 1/1000 S | — 34a |
| ▶ CT TIME | : 1/1000 S | — 34b |
| ▶ tf | : 3.0 mS | — 34c |
| ▶ tr | : 3.0 mS | — 34d |

FIG. 14

| | | |
|---|---|---|
| ▶ SET SHT SP | : 1/1000 S | — 34a |
| ▶ CT TIME | : SHT NOT OPENED | — 34b |
| ▶ tf | : ——— mS | — 34c |
| ▶ tr | : ——— mS | — 34d |

FIG. 15

| | | |
|---|---|---|
| ▶ SET SHT SP | : 1/1000 S | ~ 34a |
| ▶ CT TIME | : SHT NOT CLOSED | ~ 34b |
| ▶ tf | : 3.0 mS | ~ 34c |
| ▶ tr | : ——— mS | ~ 34d |

FIG. 16

| | | |
|---|---|---|
| ▶ SET SHT SP | : 1/1000 S | ~ 34a |
| ▶ CT TIME | : 1/928 S | ~ 34b |
| ▶ tf | : 3.0 mS | ~ 34c |
| ▶ tr | : 3.1 mS | ~ 34d |

FIG. 17

| | | | |
|---|---|---|---|
| ▶ SET SHT SP | : | 1/8000 S | ~ 34a |
| ▶ CT TIME | : | SHT OPEN (UNDETECTABLE) | ~ 34b |
| ▶ tf | : | 3.0 mS | ~ 34c |
| ▶ tr | : | 3.0 mS | ~ 34d |

FIG. 18

| | | | |
|---|---|---|---|
| ▶ SET SHT SP | : | 1/1000 S | ~ 34a |
| ▶ TIME ERR | : | −0.14 Tv | ~ 34e |
| ▶ tf ERR | : | 0 mS | ~ 34f |
| ▶ tr ERR | : | +0.1 mS | ~ 34g |

CAMERA HAVING THE CAPABILITY TO DETECT AND DISPLAY INSUFFICIENT SHUTTER SPEED

This application is a continuation of application Ser. No. 08/350,053, filed Nov. 29, 1994, now abandoned.

BACKGROUND OF THE INVENTION

1. Field of the Invention

The present invention relates to a camera that includes a shutter running condition detecting means.

2. Related Background Art

Conventionally, in operation of cameras, the lens diaphragm limits the light flux from a photographing subject and the mechanical shutter limits the exposure time for a photographing film. The shutter used for the single-lens reflex camera is basically formed of two sheets of curtain including the leading curtain and the trailing curtain and the so-called leading curtain covers the picture surface of the film before the exposure operation.

First, when the shutter button is depressed, the leading curtain is withdrawn from the picture surface to start exposing the surface of the film to light. After a predetermined period of time, the trailing curtain covers the surface of the film. The run of each of the curtains is done by means of a spring force biased mechanically. The start of the run is made by releasing each curtain latched. In prior art, these operations have been totally done under mechanical control, but now are done under electrical control in most cases. Like the prior art, the spring force is utilized to run the leading and trailing curtains, but the start of the run is controlled by activating the electromagnet that latches the curtains.

On the other hand, increasing the shutter speed to, for example, ⅛₀₀₀ sec. has been one of the important specifications. Moreover, recent frequent uses of a stroboscopic photography have been required the stroboscopic synchronization at high speed by which can perform imaging under a bright environment.

In order to achieve the purposes, the running speed (the curtain speed) of each of the curtains must be sharply increased by strengthening the spring force and controlled so as to narrow the width of the slit formed by the leading and trailing curtains. Even if the activating timing of the electromagnet is controlled accurately, the releasing speed of the latching mechanism to the electromagnet as well as the variation in the mechanical running system including a spring may prevent the shutter from operating at a desired shutter time, and more particularly at a high speed over ⅛₀₀₀ sec. This phenomenon can be first found after developing the film. Hence, a shutter which includes means for detecting its operational condition during or immediately after a photographing operation has been proposed.

However, there has been a problem in that a small detecting element mounted within a camera body cannot detect a high speed over ⅛₀₀₀ sec. with a good accuracy. A detecting element with a detection accuracy of 10 $\mu$s, for example, can detect ⅛₀₀₀ sec., or about 122 $\mu$s, but shows an inferior detection accuracy to high shutter speeds faster than ⅛₀₀₀ sec. Moreover, where the detection accuracy of the detection element depends on variations in temperatures, the above-mentioned problem arises. Furthermore, it has been required to consider a display mode in the case of an insufficient detection accuracy.

SUMMARY OF THE INVENTION

In order to overcome the foregoing problems, an object of the present invention is to provide an improved camera that can inform a photographer of the fact that the detection accuracy of the detecting element is insufficient with respect to the inspection shutter speed, thus dealing with the situation.

In order to achieve the objects described above, the camera according to the present invention is characterized by a shutter to limit the exposure time for a record medium; a shutter speed setting unit, hereinafter referred to as setting means, to set, the shutter speed of the shutter a shutter driver and controller, herein referred to as driving and controlling means, for driving and controlling the shutter; a shutter condition detector, hereinafter references as detecting means, to detect the operational condition of the shutter; a manifesting unit to manifest the result detected by the detector; and a memory to store previously inherent data to detect with the shutter condition detecting means. Thee manifesting unit is driven by the shutter condition detecting means, based on the shutter speed set by the shutter speed setting means and inherent data stored in the memory means, and then notifies of the result detected by the shutter condition detecting means.

Moreover, according to the present invention, the camera is characterized by a shutter to limit the exposure time for a record medium; a shutter speed setting means for setting the shutter speed of the shutter a shutter driving and controlling means for driving and controlling the shutter; a shutter operation condition detecting means for detecting the operational condition of the shutter condition detecting means; and a display means for displaying the operational time detected by the shutter condition detecting means.

According to the present invention, the shutter detection estimation level can be varied in accordance with a set shutter time so that the optimum estimation can be performed corresponding to the detection accuracy of the shutter detection means. Varying the display mode in accordance with the detection accuracy enables a most suitable display even if the detection accuracy is insufficient.

BRIEF DESCRIPTION OF THE DRAWINGS

FIG. 13 is a front view showing an LCD (liquid crystal display) used for the camera according to an embodiment of the present invention, the LCD showing a display example;

FIG. 14 is a front view showing an LCD (liquid crystal display) used for the camera according to an embodiment of the present invention, the LCD showing a display example;

FIG. 15 is a front view showing an LCD (liquid crystal display) used for the camera according to an embodiment of the present invention, the LCD showing a display example;

FIG. 16 is a front view showing an LCD (liquid crystal display) used for the camera according to an embodiment of the present invention, the LCD showing a display example;

FIG. 17 is a front view showing an LCD (liquid crystal display) used for the camera according to an embodiment of the present invention, the LCD showing a display example;

FIG. 18 is a front view showing an LCD (liquid crystal display) used for the camera according to an embodiment of the present invention, the LCD showing a display example.

DETAILED DESCRIPTION OF THE PREFERRED EMBODIMENTS

An embodiment of the present invention will be explained below with reference to the attached drawings.

Figure 1:
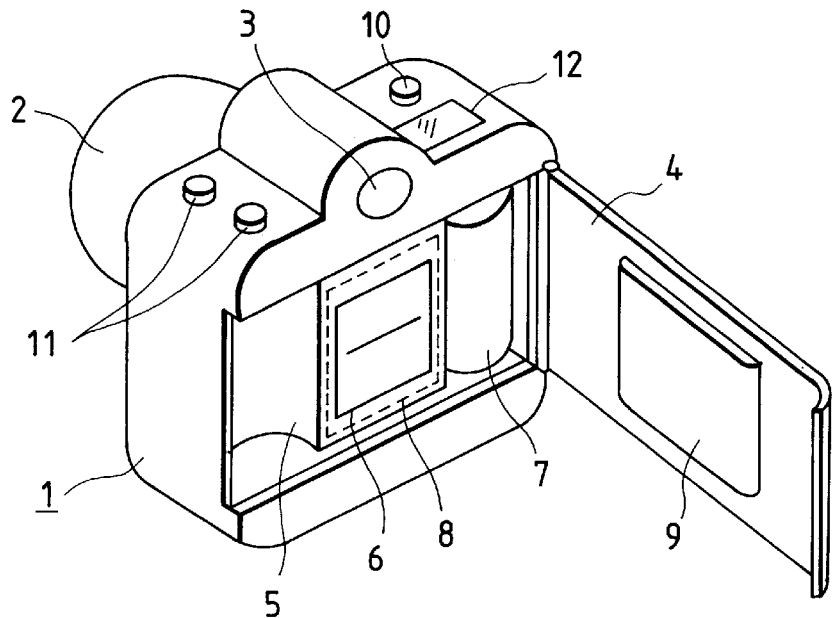
FIG. 1 is a perspective view showing the camera according to an embodiment of the present invention.

FIG. 1 is a perspective view showing the camera according to an embodiment of the present invention.

FIG. 1 shows the back cover 4 opened. The film cartridge (not shown) is loaded around the cartridge room 5. The film taken out of the cartridge is wound over the spool 7 across the front surface of the aperture 6. The pressure plate 9 mounted on the inner side of the back cover 4 presses a film (not shown) against the aperture 6 to keep the flatness thereof. The shutter 8 mounted inside the aperture 6 covers the wider area (shown in broken lines) slightly larger than the aperture 6 and illuminates rays from a subject through the lens 2 onto the film surface for a predetermined period of time.

A photographer recognizes visually the condition of a subject passing through the lens 2 through the view finder 3 and depresses the release button 10 to command to start an exposure operation. The exposure mode and various conditions can be ascertained by the display unit 12. The display unit 12 includes an LCD (liquid crystal diplay) 34 (to be described later). Two set buttons 11 are operational buttons each of which sets arbitrarily the operational mode and various conditions of the camera 1 and is operated over ascertaining characters on the display unit 12.

Figure 2:
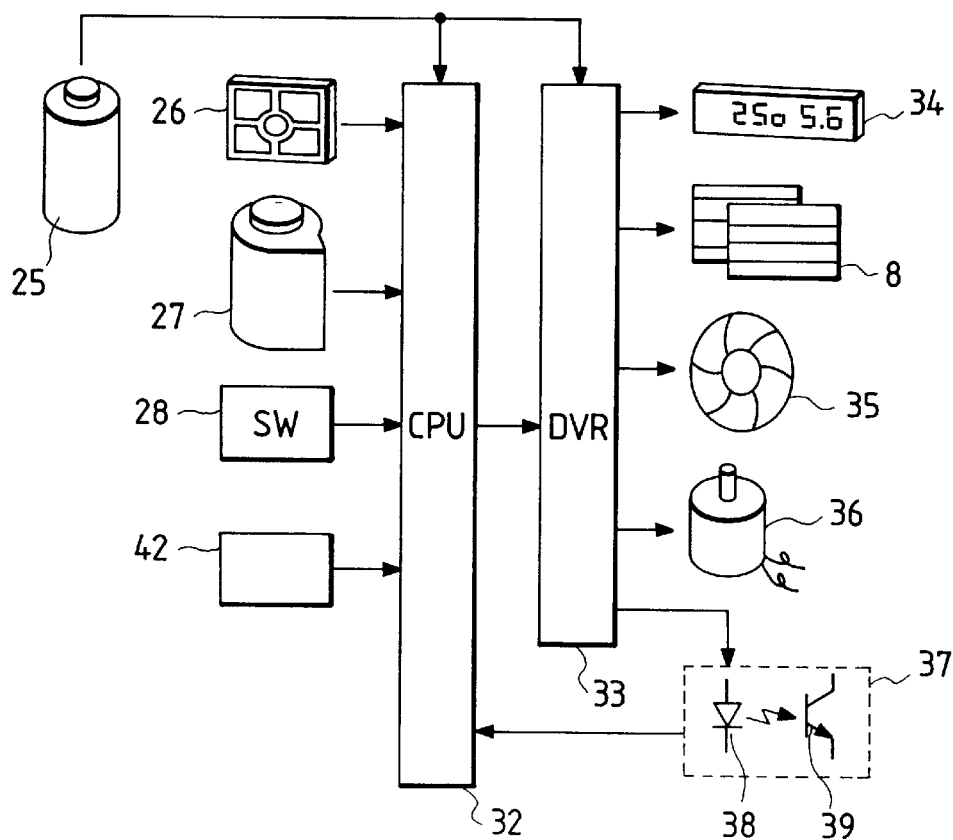
FIG. 2 is a block connection diagram showing the camera according to an embodiment of the present invention.

FIG. 2 is a block connection diagram showing the camera according to an embodiment of the present invention.

The present circuit includes a battery 25 acting as a power source. The CPU 32 executes the central control. The CPU 32 receives input signals as follows:

The photometric meter unit 26 is a sensor unit that determines the brightness of each portion of a subject by plurally dividing the subject. The plural photometric values are input to the CPU 32. The film sensitivity detecting unit 27 reads the code signal attached on the side surface of the film cartridge loaded. The information on the film sensitivity is input to the CPU 32. The switch detecting unit 28 includes the release button 10, a manually-operating switch including a switch cooperated with the set button 11, and a timing switch to detect the sequence condition of a camera. The information regarding the condition of a camera is input to the CPU 32. The temperature sensor 42 detects the temperature of the camera 1 and then input. the temperature information to the CPU 32.

The CPU 32 executes the following drive control through the drive unit 33.

The LCD 34 is driven to display information regarding exposure and an operational mode setting as well as warning information. The shutter 8 (in detail, the operational interval between the leading curtain magnet and the trailing curtain magnet) is controlled to adjust the exposure time. The diaphragm 35 in the lens 2 is driven to control amount of the passing rays. The motor 36 is driven to execute the biasing operation of the shutter drive spring, film winding, film rewinding feeding, charging the mirror and the diaphragm, and the like. Moreover, the CPU 32 controls the shutter-curtain run detecting unit 37. The LED (light emitting diode) 38 emits light and then the CPU 32 receives the signal from the PTR (photo-transistor) 39. These will be described later in detail.

Figure 3:
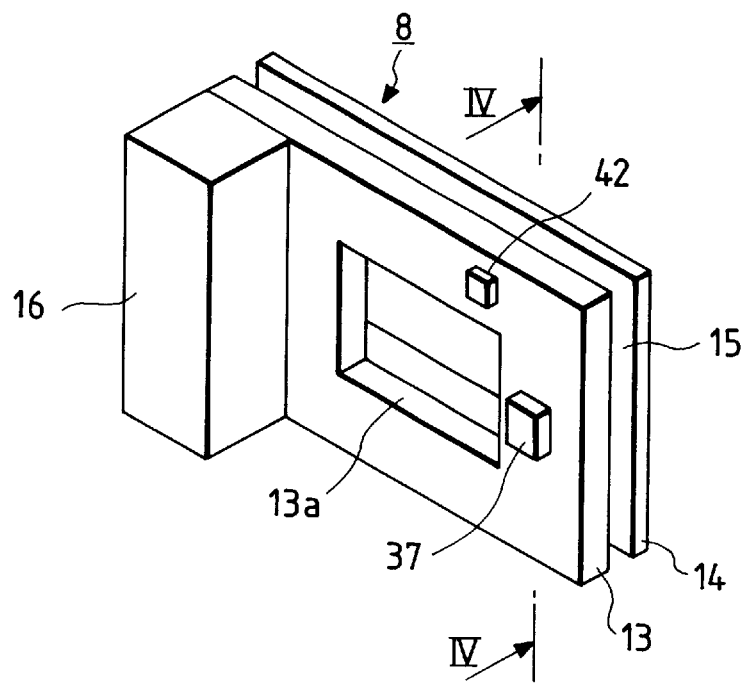
FIG. 3 is a perspective view showing a shutter unit used for the camera according to an embodiment of the present invention.

FIG. 3 is a perspective view showing the shutter 8. The substrate 13 and the cover plate 14 are arranged substantially in parallel so as to hold a spacing by a shaft member (not shown). A wing room 15 is formed in the spacing. The aperture 13a for exposure is formed in the substrate 13 and at the same position as that of the aperture 6 of the camera 1. An aperture 14a(not shown) is formed in the cover plate 14 and substantially at the same position as the aperture 6 and aperture 13a. A shutter mechanism 16 is formed of a drive mechanism including shutter wing springs, a control mechanism with an electromagnet for performing the second control, a charging mechanism for charging the former mechanism, and others. The shutter-curtain run detecting unit 37 is mounted on the substrate 13 and on the opposite side from the shutter mechanism 16 via the aperture 13a. Moreover, the temperature sensor 42 is mounted on the substrate 13.

Figure 4:
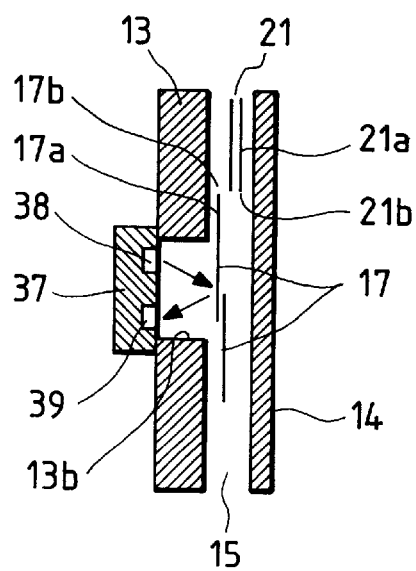
FIG. 4 is a cross-sectional view, taken along the line IV—IV, showing the shutter unit according to an embodiment of the present invention.

FIG. 4 is a cross sectional view of the shutter 8 taken along the line IV—IV shown in FIG. 3. The front wing group 17 and the rear wing group 21 are arranged in the wing room 15 so as to travel between the position where the opening 13a is covered and the position where the opening 13a is opened. The LED 38 and the PTR 39 are arranged in the shutter-curtain run detecting units 37. The front wing group 17 and the rear wing group 21 are detected through the detection opening 13b opened in the substrate 13 in the front of the shutter-curtain run detecting unit 37. That is, if the front wing group 17 and the rear wing group 21 exist in the light path, the rays from the LED 38 are reflected by the front wing group 17 and the rear wing group 21 and then enter the PTR 39. If the front wing group 17 and the rear wing group 21 do not exist in the light path, the PTR 39 does not receive the reflected rays. According to the above-discriminating operation, the front wing group 17 and the rear wing group 21 can be detected. The PTR 39 outputs its signal at light receiving time but does not output it at no light receiving time.

In other words, in order to start an exposure, the front wing group 17 shown in FIG. 4, is driven from the position where the opening 13a is covered to the position where the opening 13a is opened. When the end of the slit forming wing 17b of the slit forming wing 17a comes to the position of the shutter-curtain run detecting units 37, the output of the PTR 39 changes from a low level to a high level. In order to terminate the exposure, the rear wing group 21 is driven from the position where the opening 13a is opened to the position where the opening 13a is covered. Then, the end of the slit forming wing 21b of the slit forming wing 21a comes to the position of the shutter-curtain run detecting unit 37, the PTR 39 changes its output from a high level to a low level.

Figure 5:
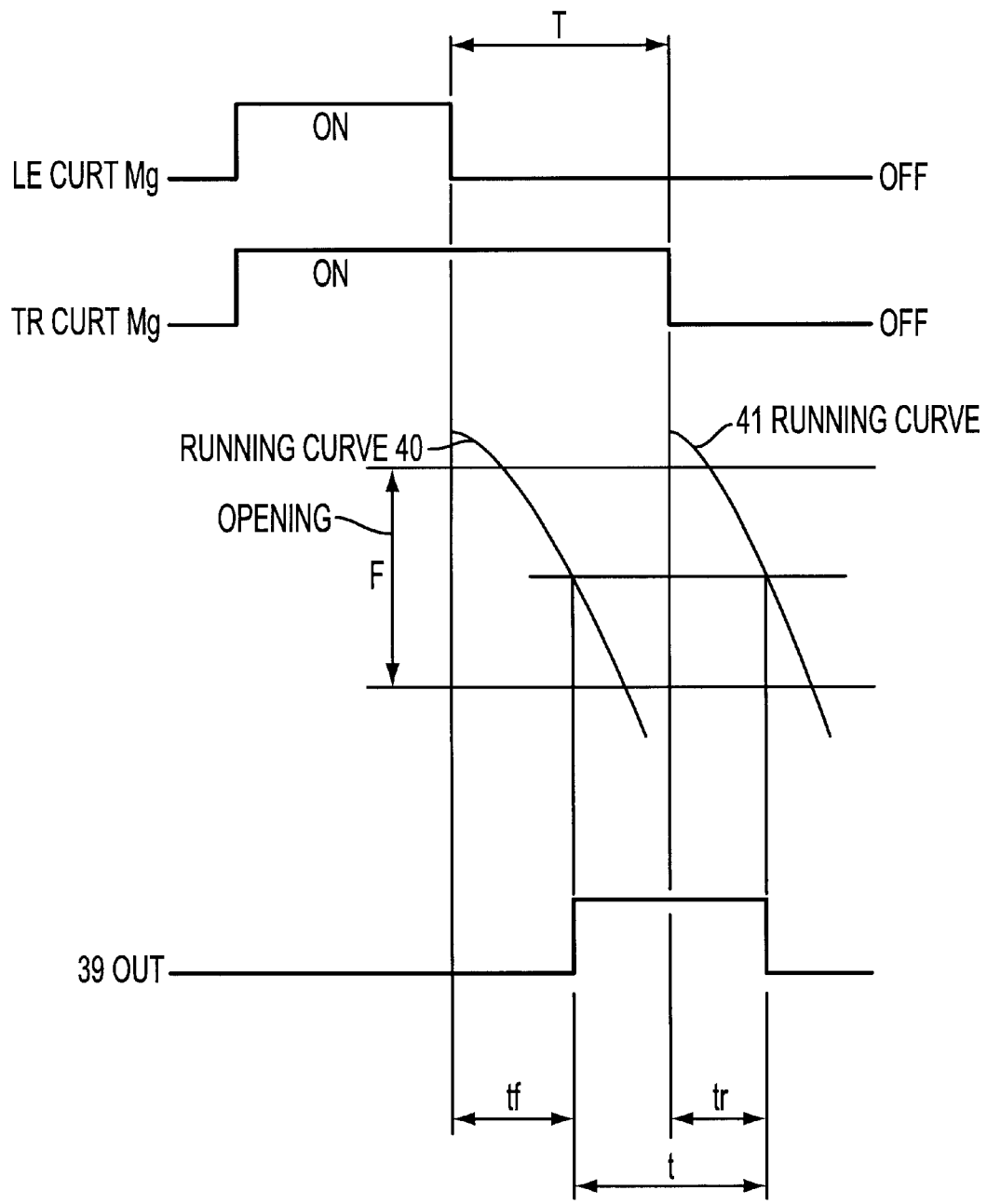
FIG. 5 shows a timing chart for the shutter unit of the camera according to an embodiment of the present invention.

FIG. 5 is a timing chart showing the operation of the shutter 8.

FIG. 5 shows the running condition of each curtain that changes and a change in the detection signal from the PTR 39, in accordance with the on/off operation of the leading curtain and trailing curtain control magnet (Mg). When the release button 10 is depressed, the leading curtain magnet and the trailing curtain magnet are energized on, thus starting the electrical latching of each curtain. In this step, the condition mechanically-latched before depressing the release button 10 is switched.

Thereafter, in normal photographing, the mechanism (not shown) controls the diaphragm of the lens 2 and elevates the reflecting mirror in the photographing optical path. Next when the leading curtain magnet is turned off, the slit forming wing 17b of the slit forming wing 17a in the front wing group 17 travels as shown with the running curve 40. The range shown with F shows the vertical opening of the aperture 6. After a lapse of time tf when the leading curtain magnet has been turned off, the slit forming wing 17b of the front wing group 17 passes by the front surface of the shutter-curtain run detecting unit 37 so that the output of the PTR 39 is inverted from a high level to a low level.

When the leading curtain magnet has been turned off, the trailing curtain magnet is turned off after a lapse of a predetermined time T, or of a predetermined exposure time. This process allows the slit forming wing 21b of the slit forming wing 21a of the trailing wing group 21 to cross the opening F as shown with the running curve 41. At this time, when the trailing curtain magnet is turned off, the slit forming wing 21b of the rear wing group 21 passes by the front surface of the shutter-curtain run detecting unit 37 after a lapse of time tr so that the output of the PTR 39 is inverted from a high level to a low level.

As described above, an actual exposure time t can be recognized by measuring the period between the rise time to the falling time in the reversing time of the PTR 39.

Even if the exposure control circuit, for example, measures correctly the exposure time T and drives the leading and trailing curtain magnets with the normal timing, when the control time t obtained via the PTR 39 is different with the exposure time T, it can be decided that an erroneous operation has occurred in the mechanical system.

Furthermore, the running time (curtain speed) of each curtain can be known by measuring the time tf and the time tr. When the shutter operates normally, the time tf and the time tr represents a standard value determined in design, respectively. When the time tf and the time tr are longer than the standard values, respectively, it is decided that the curtain speed is slow. When the time tf and the time tr are shorter than the standard values, respectively, it is decided that the curtain speed is fast. Hence it can be decided that there is an exposure unevenness.

Figure 6:
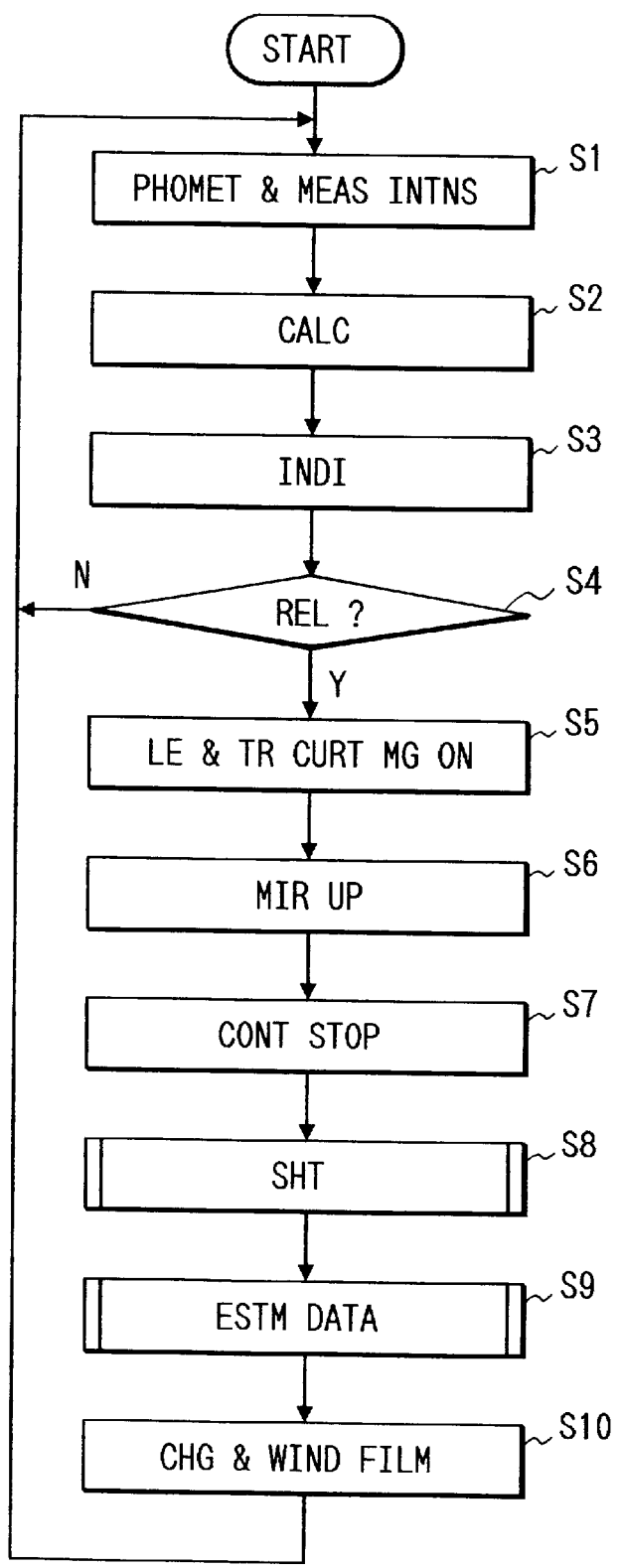
FIG. 6 is a flowchart showing a control CPU processing program used for the camera according to an embodiment of the present invention.

FIG. 6 is a flow chart showing the process routine of the CPU 32 shown in FIG. 2. This routine is repeated during feeding electric energy. Now, for explanation, it is assumed that the camera according to the present invention has the maximum shutter speed of 1/8000 sec. (=122 $\mu$s), and time tf is a standard time (design value) of 3.0 $\mu$s, and time tr is a standard time (design time) of 3.0 $\mu$s. However, it is apparent that other design values can be adopted.

In the step S1, the photometric meter unit 26 inputs a photometric signal and the sensitivity detecting unit 27 inputs a sensitivity signal. In the step S2, the two signals are subjected to an arithmetic operation and then the shutter time in seconds and the diaphragm stop are calculated. In the step S3, the above-exposure conditions are dislayed on the LCD 34.

In the step S4, it is decided whether the release button 10 has been depressed through the switch detecting unit 28. When the release button 10 is not depressed, the flow returns to the step S1 to repeat the above procedure. In the step S4, when the release button has been depressed, the leading and trailing curtain magnets, as described with respect to FIG. 5, are first turned on (step S5). In the step S6, the reflecting mirror (not shown) is flipped up to be withdrawn from the optical path. In the step S7, the diaphragm 35 is controlled to be opened to a predetermined opening size. In the step S8, the shutter routine in which the exposure of the film is controlled by opening and closing the shutter 8, and the routine in which the shutter-curtain run detecting unit 37 detects the condition of the shutter-curtain run are executed. The shutter-curtain run detecting routine will be explained in detail with reference to FIGS. 7 and 8.

In the step S9, the second data detected by the shutter-curtain run detecting unit 37 is evaluated. The second data estimating routine is explained in detail with reference to FIG. 9. In the step 10, after a completion of the exposure operation, the motor 36 is rotated positively to charge the mechanism and to take up the spool of film. Then the flow goes back to the step S1.

Figure 7:
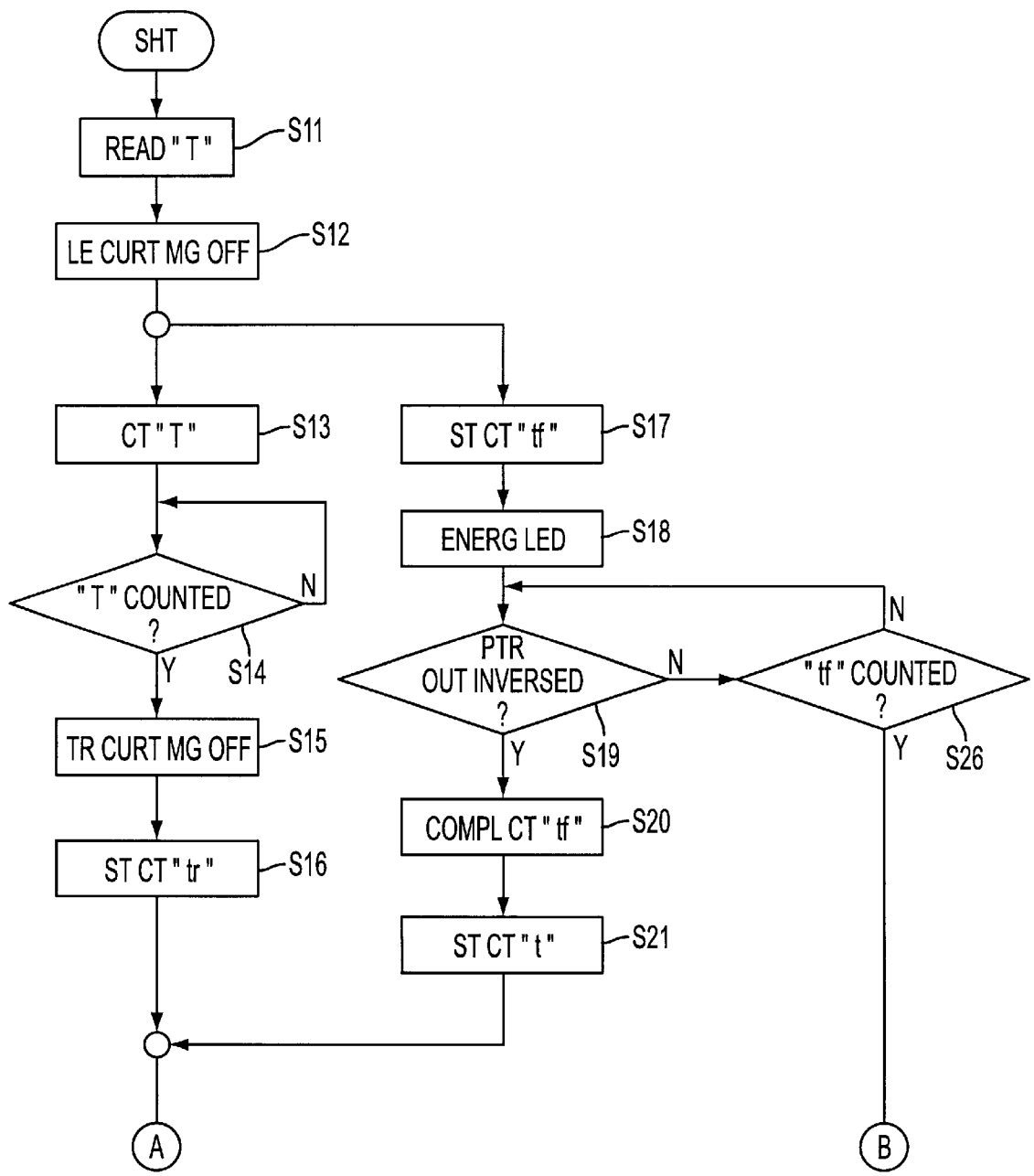
FIG. 7 is a flowchart showing a control CPU processing program used for the camera according to an embodiment of the present invention.
Figure 8:
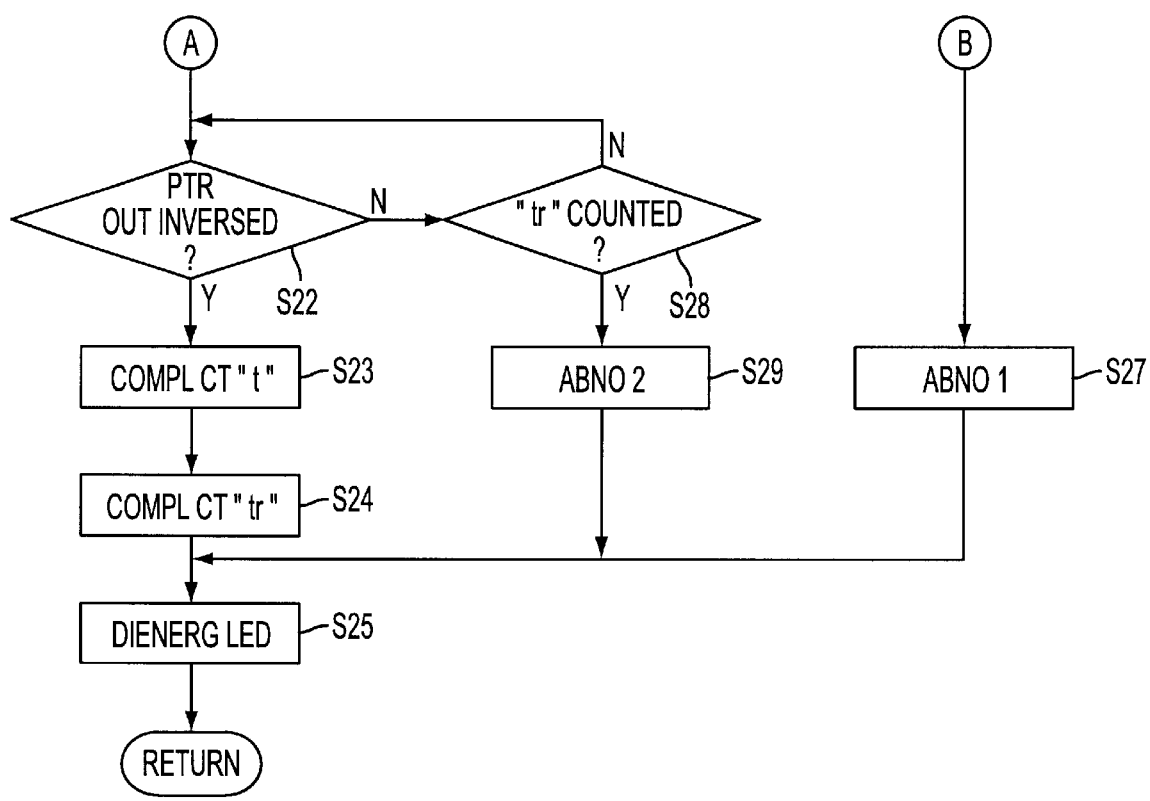
FIG. 8 is a flowchart showing a control CPU processing program used for the camera according to an embodiment of the present invention.

FIGS. 7 and 8 are a flow chart showing in detail the shutter-curtain run condition detecting routine (step S8), respectively.

In the step S11, the shutter speed T in seconds set in the step S2 is read out. In the step S12, feeding electric energy to the leading curtain magnet is terminated and then the front wing group 17 starts running. Thereafter, steps following the steps 13 and 17 are performed simultaneously. For easy explanation, the shutter speed T in seconds sufficiently longer than the running time of each wing group has been shown in the present embodiment. However, it can be considered in accordance with the present flow chart that the shutter speed T in seconds is shorter than the running time of each wing group.

In the step S13, measuring the shutter speed T in seconds starts. A completion of the measurement of the shutter speed T in second is awaited in the step S14. In the step S15, activating the trailing curtain magnet is completed after a lapse of the shutter time T in seconds, and then the run of the rear wing group 21 is started. In the step S16, measuring the count time tr is started while the tr timer is operated. In the step S17, as in the step 13, measuring the count time tf is started while the tf timer is operated. In the step S18, the LED 38 emits light. In the step S19, if the passage of the slit forming wing 17a of the front wing group 17 causes an inverted signal output from the PTR 39, the flow goes to the step S20. If the output is not inverted, the flow goes to the step S26. In the step S20, it is completed to measure the count time tf. In the step S21, it is started to measure the count time t.

In the step S22 (FIG. 8), if the output of the PTR 39 is inverted because of the passage of the slit forming wing 21a of the rear wing group 21, the flow goes to the step S23. If not inverted, the flow goes to the step S28. In the step S24, measuring the count time tr has been completed. In the step S25, the LED 38 is turned off after the completion of the measurement and then the flow goes back to the step S9 in FIG. 6. In the step S26 (FIG. 7), it is decided whether the tf timer has counted a count time exceeding a predetermined period of time (preferably, a time suitably longer than the time tf of the standard value 3 ms, for example, 10 ms). If the count time does not exceed the predetermined value, the flow goes back to the step S19. If the time exceeds the predetermined value, the flow goes to the step S27 in FIG. 8. In the step S27, it is decided that an abnormal condition has occurred because the tr timer has counted a count time over a predetermined value (10 ms) (abnormal condition 1). At this time, the processes following the step S16 advancing simultaneously from the step S13 are interrupted. Then the flow goes to the step S25.

In the step S28, it is decided whether the tr timer has counted a count time exceeding a predetermined value (preferably, a time tr suitably longer than the standard value 3 ms, for example, 10 ms). If the count time does not exceed the predetermined value, the flow goes to the step S22. If the count time exceeds the predetermined value, the flow goes to the step S29. Now, in the step S29, it is decided that an abnormal condition has occurred because the tr timer has counted a count time over a predetermined value (10 ms) (abnormal condition 2). Then the flow goes to the step S25.

Figure 9:
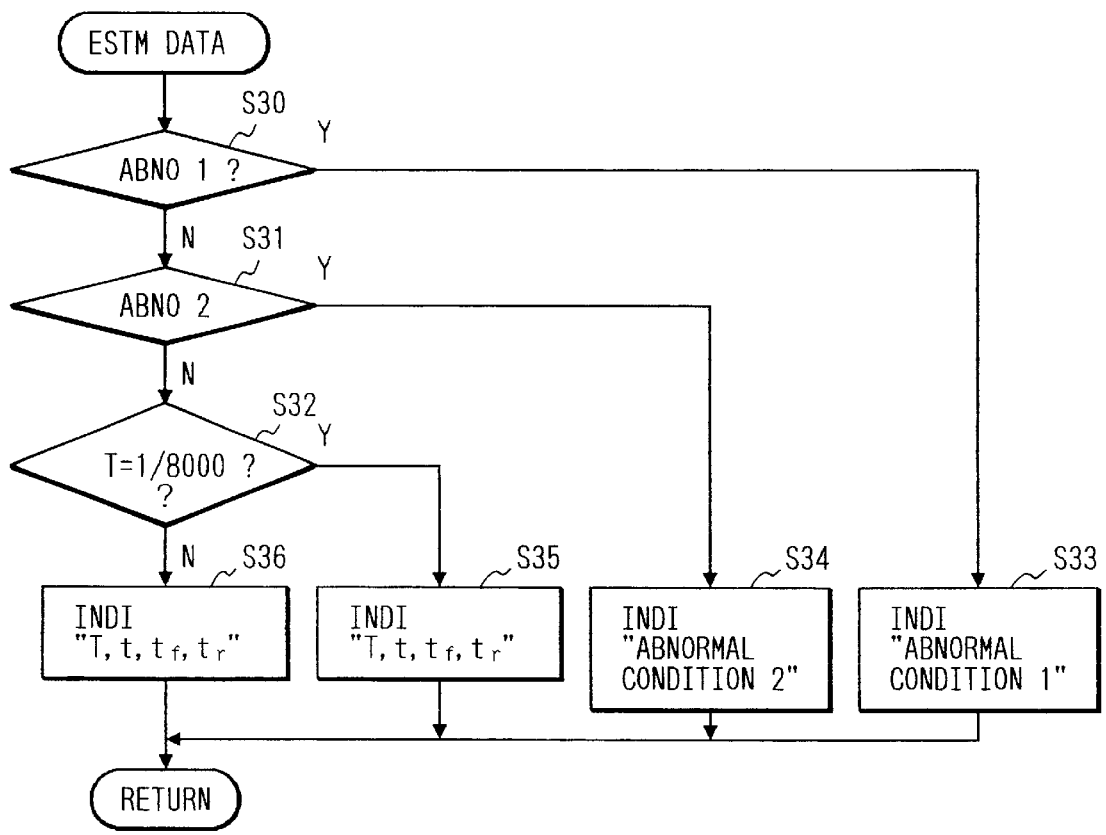
FIG. 9 is a flowchart showing a control CPU processing program used for the camera according to an embodiment of the present invention.

FIG. 9 is a flow chart showing in detail the routine evaluating data regarding the second data estimating routine as shown in FIG. 6 (step S9).

In the step S30, it is decided whether the step S27 in FIG. 8 was in the abnormal condition 1. If in the abnormal condition 1, the flow goes to the step S33 and if not in the abnormal condition 1, the flow goes to the step S31. In the step S31, it is decided whether the step S29 in FIG. 8 was in the abnormal condition 2. If in the abnormal condition 2, the flow goes to the step S34 and if not in the abnormal condition 2, the flow goes to the step S32. In the step S32, it is decided whether the shutter speed T in seconds set in the step S2 (FIG. 6) is 1/8000 sec. (the maximum shutter speed). If 1/8000 sec., the flow goes to the step S35 and if not, the flow goes to the step S36.

In the step S33, because the step S30 decided to be the abnormal condition 1, the LCD 34 displays the corresponding indication (warning display). In the step S34, because the step S31 decided to be the abnormal condition 2, the LCD 34 displays the corresponding indication (warning display). In the step S35, since the situation is not the abnormal condition 1 or 2 but the shutter speed is set to 1/8000 sec., the LCD display unit 34 displays the time t, time tf and time tr. In the step S36, since the situation is not the abnormal condition 1 or 2 and the shutter speed is not set to 1/8000 sec., the LCD 34 displays the time t, time tf and time tr.

The time chart for a normally-operating shutter is shown in FIG. 5. Here because the shutter is malfunctioning, the-main aspects will be explained in detail using the time chart.

Figure 10:
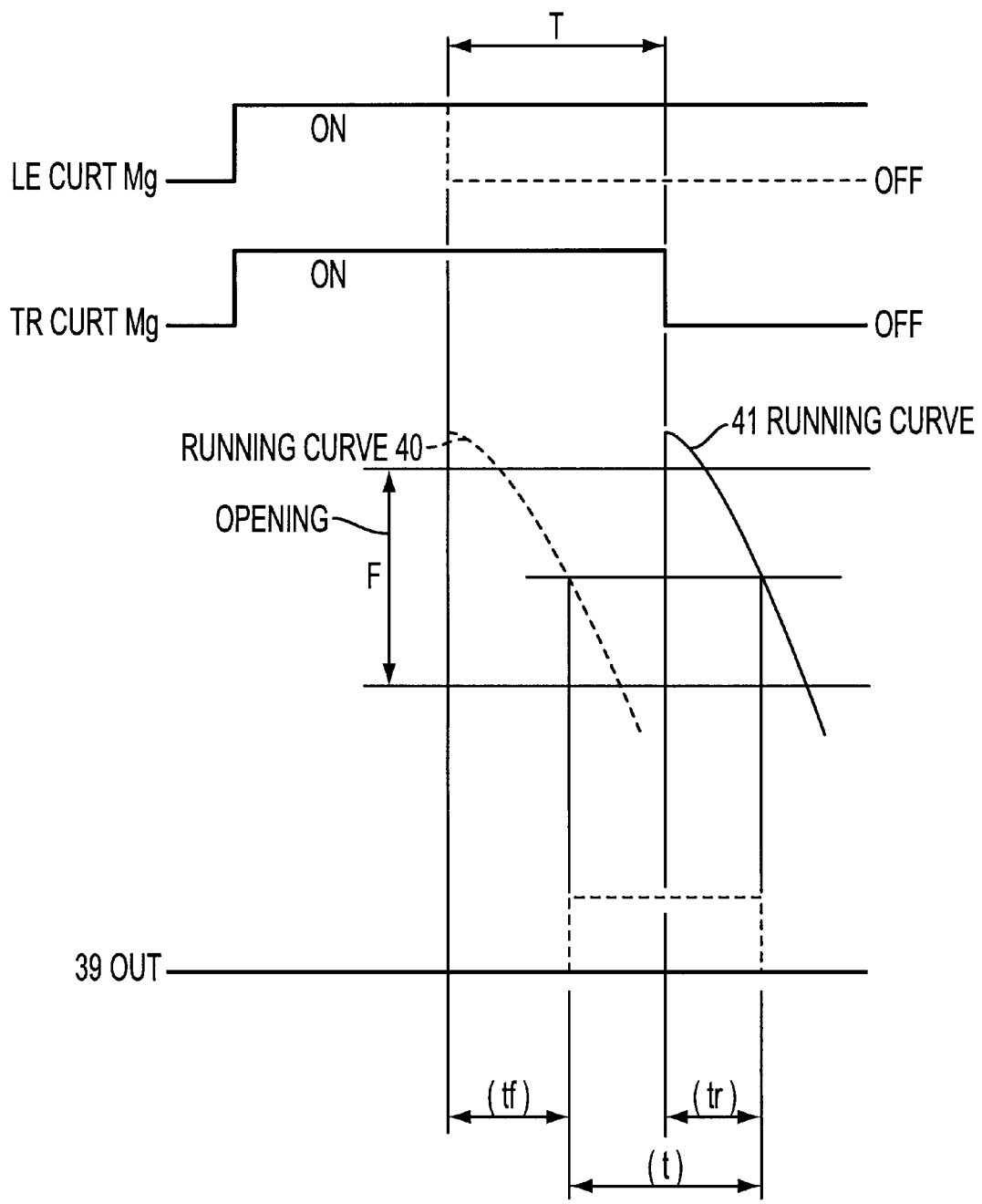
FIG. 10 shows a timing chart of the shutter used for the camera according to an embodiment of the present invention.

(1) Malfunction of the Leading Curtain (Refer to the Time Chart in FIG. 10):

In this abnormal condition, the leading-curtain magnet remains on state because of its operational failure (as shown in FIG. 10). In this case, since the front wing group 17 does not run, the exposure operation is not performed. Since the shutter-curtain run detecting unit 37 is kept to be covered by the front wing group 17, the output of the PTR 39 is in a low level. Referring to FIG. 10, both the trailing-curtain magnet and the rear wing group 21 operate normally. However, even if these elements are in an abnormal condition, the PTR 39 produces no output. Hence the time t, time tf, and time tr cannot be detected, as shown in FIG. 10.

The abnormal condition includes, for example, the case where an electrical failure does not release the electrical attraction of the leading-curtain magnet and keeps the leading-curtain magnet in operational failure, thus paralyzing the run of the front wing group 17; the case where a mechanical failure stops an operation of the leading-curtain magnet, thus paralyzing the run of the front wing group 17; and the case where the failure of the front wing group 17 alone paralyzes its running. With the shutter speed in seconds for example set near to the maximum high speed in second, even if the leading and trailing curtain magnets and the front and rear wing groups 17 and 21 operate normally, the slight shift between the operational timings may cause the operational timings of the front wing group 17 and the rear wing group 21 to be inverted. The reason is that the time difference each between the operational timing of the leading-curtain magnet and the operational timing of the trailing-curtain magnet and between the running timing of the front wing group 17 and the running timing of the rear wing group 21 is very small. In this case, since either the front wing group 17 or the rear wing group 21 covers always the opening F and the shutter-curtain run detecting unit 37, the exposure operation is not performed while the PTR 39 does not produce its output.

Figure 11:
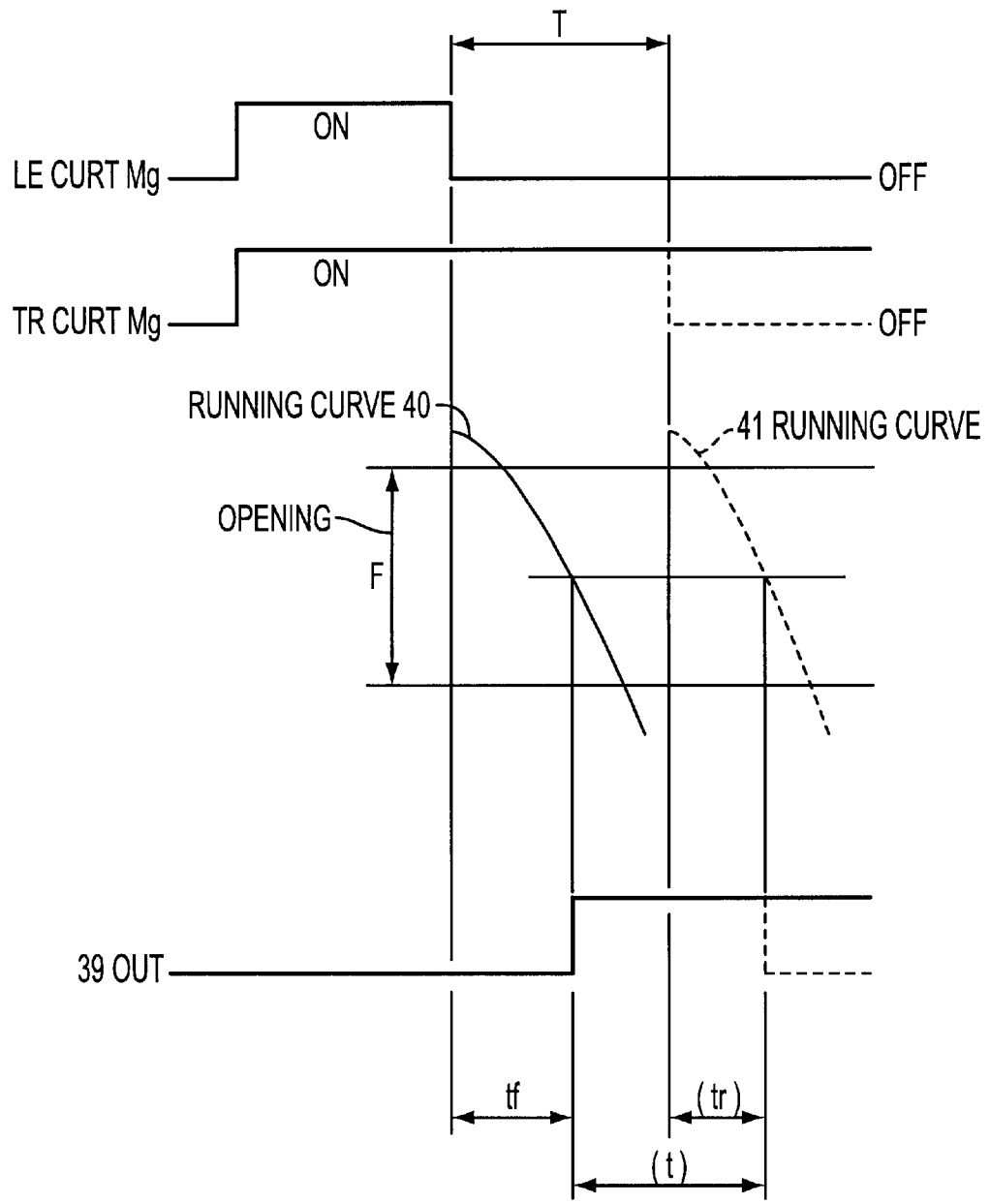
FIG. 11 shows a timing chart of the shutter used for the camera according to an embodiment of the present invention.

(2) Malfunction of the Trailing Curtain (Refer to the Time Chart in FIG. 11):

In this abnormal condition, for example, the trailing-curtain magnet remains in the on state because of its operational failure, as shown in FIG. 11. In this case, since the rear wing group 21 does not run, the opening F is kept open. Moreover, since the rear wing group 21 does not cover the shutter-curtain run detecting unit 37, the output of the PTR 39 is in a high level.

Therefore the time tf can be detected but the time t and time tr cannot be detected. This abnormal condition includes the case where since the electrical attraction of the trailing-curtain magnet is not released due to an electrical failure (or the trailing-curtain magnet does not operate), the rear wing group 21 does not run; the case where a mechanical failure causes a malfunction of the trailing-curtain magnet so that the rear wing group does not run; and the case where the rear wing group 21 alone does not run due to its operational failure.

Figure 12:
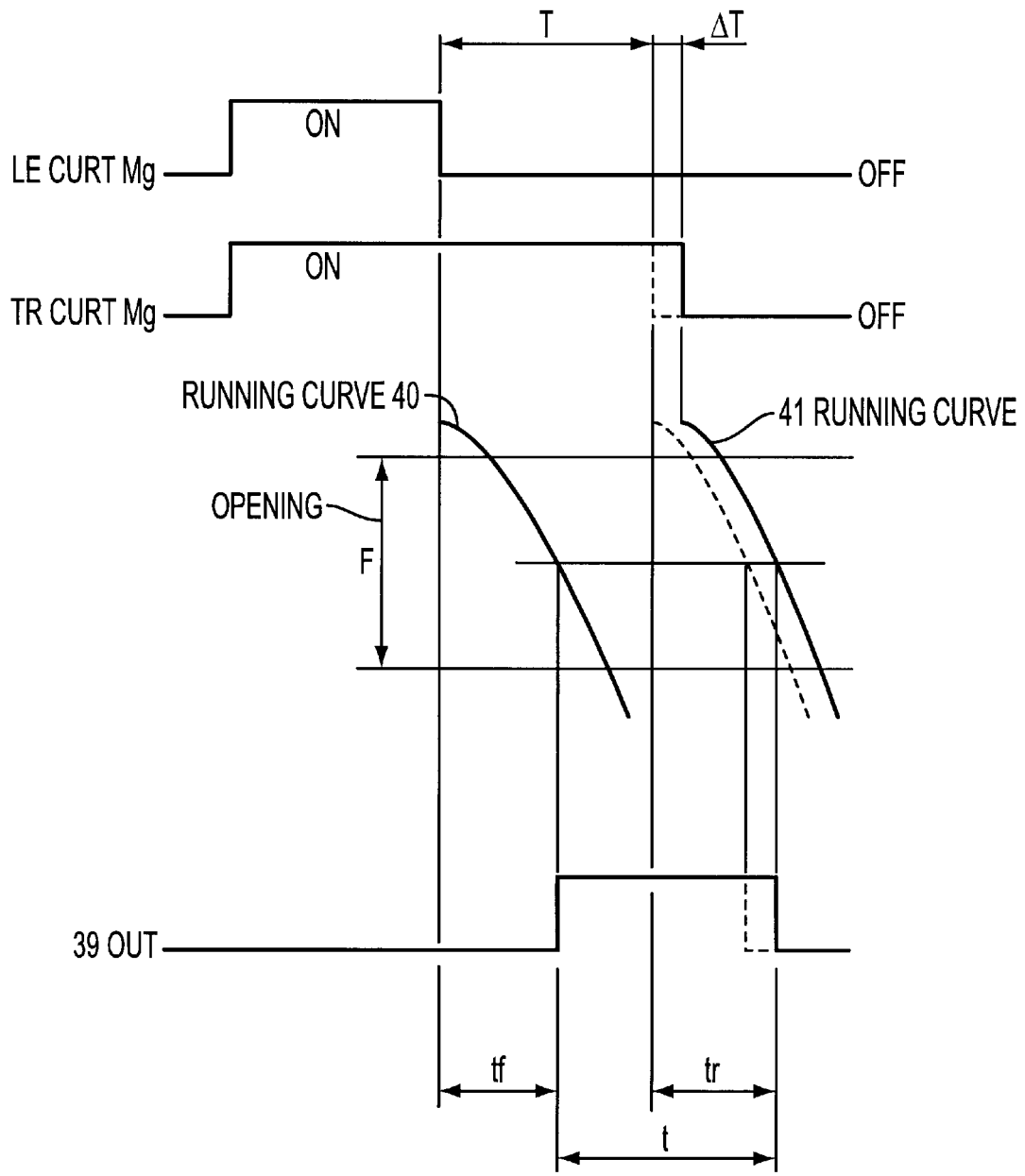
FIG. 12 shows a timing chart of the shutter used for the camera according to an embodiment of the present invention.

(3) Erroneous Timing in Exposure Operation (Refer to the Time Chart in FIG. 12):

FIG. 12 shows the example where the operational timing of the trailing-curtain magnet is delayed by $\Delta T$, or the running curve 41 of the trailing curtain is shifted behind by $\Delta T$. In this case, since the exposure operation has been performed, the PTR 39 produces its output so that the time t, time tf and time tr can be detected. FIG. 12 shows the case where the timing is delayed on the running curve of the trailing curtain. Such a shift in timing is caused due to the case where the timing of the running curve 41 of the trailing curtain advances more, the case where the timing of the running curve 40 of the leading curtain becomes slower or faster; or the case where the timings of the leading curtain and the trailing curtain are shifted to each other.

With the slow timing of running curve 40 of the leading curtain or/and the fast timing of the running curve 41 of the trailing curtain, and the shift in timing larger than the shutter time T in seconds even if the shutter is operated as the operational failure of the leading curtain described in the item (1), the operational timings of the front wing group 17 and the rear wing group 21 are inverted so that the PTR 39 does not produce its output because no exposure operation has occurred. Hence in consideration of the output of the PTR 39, the above-described operation is similar to that according to the time chart shown in FIG. 10.

FIGS. 13 to 17 show the contents displayed on the LCD 34 regarding part of the shutter information. The LCD 34 displays four kinds of information: t he display 34 of set time in seconds, the display 34b of count time t and the display 34c of time tf, and the display 34d of time tr.

Explanation will be made next as for the case where the front wing group 17 and the rear wing group 21 operate according to the timing charts shown in FIG. 5 and FIGS. 10 and 12, as well as the case where the shutter operates according to the timing charts shown in FIGS. 7 and 8. The evaluative operation also will be explained corresponding to the flow chart shown in FIG. 9. First, the case where the shutter speed T is set to a value in seconds (e.g. 1/1000 sec.) except the maximum speed in second. will be explained. Next the case where the shutter speed T is set to the maximum speed in seconds (e.g. 1/8000 sec.) will be explained.

1. Shutter Speed Set to 1/1000 Sec.:
(1) Normal Operation (Refer to the Time Chart in FIG. 5):

In the step S11, the shutter speed T in second at 1/1000 sec. is read out. In the step S12, the leading curtain magnet is turned off and then the front wing group 17 starts its running. In the step S13, the measurement of the shutter time T in second is started. After a lapse of T=1/1000 sec. in the step S14, the flow goes to the step S15. Then the trailing curtain magnet is turned off and the rear wing 21 starts its running. In the step S12, measuring the time tr is stated.

On the other hand, immediately after the leading-curtain magnet is turned off in the step S12, the measurement of the time tf is started in the step S17. The LED 38 of the shutter-curtain run detecting means 37 emits light in the step S18. In the step S19, the flow waits for the inversion (rise-up) of the output of the PTR 39. A rise-up is obtained because of the normal operation of the shutter. The flow goes to the step S20 and then the time tf is completely measured. Hence data on the time tf (in this normal case, 3 ms) can be obtained.

Next, measuring the time t is started in the step S21. The inversion (falling) of the output from the PTR 39 is waited for in the step S22. Since the shutter is in a normal operation, the output rises up. Hence measuring the time t is completed in the step S23 and measuring the time tr is completed in the step S24. Hence data regarding the time t (1/1000 sec.) as well as data regarding the time tr (3 ms) can be obtained. Thereafter, the LED 38 is turned off in the step S25.

In succession, the evaluative operation will be explained below with reference to the flow chart shown in FIG. 9.

Because of the normal operation, through the steps S30 and S31, the set time T in seconds is decided in the step S32. Since the shutter speed is now set to 1/1000 sec., the flow goes to the step S36 and then the resultant data is displayed on the LCD 34. FIG. 13 shows the display example. The set second display 34a displays the set time of 1/1000 sec., the count time display 34b displays 1/1000 sec., the tf display 34c displays 3.0 ms, and the tr display 34d displays 3.0 ms.

(2) Malfunction of the Leading Curtain (Refer to the Time Chart in FIG. 10):

The steps S11 to S18 are similar to the steps in the normal operation. However, in the step S19, as shown with the time chart in FIG. 10, since the PTR 39 does not produce its inverted (rise-up) output due to the front wing group 17, the flow does not go to the step S20. After a lapse of the set time (10 ms) set by the tf timer in the step S26, the flow goes to the step S27. Immediately after it is decided that the system is in the abnormal condition 1, the steps following the step S16 and advancing at the same time from the step S13 are interrupted. Hence data regarding the time t, tf, and tr cannot be obtained. Thereafter, the LED 38 is turned off in the step S25.

Next, an evaluative operation will be explained with the flow chart shown in FIG. 9.

Because of the abnormal condition 1, the flow goes from the step S30 to the step S31. The LCD 34 displays the abnormal condition 1. FIG. 14 shows the display example. The set time in second display 34a displays a set second (e.g. 1/1000 sec.). The time t, tf and tr cannot be detected and displayed. However, in order to display the abnormal condition 1, the count time display 34b displays, for example, "shutter closed" as shown in FIG. 14.

(3) Malfunction of the Trailing Curtain:

The step S11 to S21 are similar to the steps in the normal operation. As shown with the time chart in the step S22 shown in FIG. 11, the rear wing group 21 does not allow the output of the PTR 39 to be inverted (risen up), the flow does not go to the step S23. After the tr timer operates for a set time (10 ms) in the step S28, the flow goes to the step S29, so that it is decided that the system is in the abnormal condition 2. Thereafter, the flow goes to the step S25 and then the LED 38 is turned off. Hence data on the time tf can be obtained but data on the time t and tr cannot be obtained.

Next, explanation will be made as for the evaluative operation in accordance with the flow chart shown in FIG. 9.

Because of the abnormal condition 2, the flow goes from the step S30 to the step S31 and then the LCD 34 displays the abnormal condition 2 in the step S34. FIG. 15 shows the display example. The second display 34a displays a set seconds (1/1000 sec.) and the time tf display 34c displays a detected time (3 ms). Since the time t and tr cannot be detected, they are not being displayed. The count time display 34b displays, for example, "shutter closed".

(4) Erroneous Timing in Exposure Operation (Refer to the Time Chart in FIG. 12):

Since the exposure operation is performed, the operations in accordance with the flow charts shown in FIGS. 7 and 8 are similar to the item (1) normal operation, but data on a different time can be obtained. According to the present embodiment, it is assumed that the operational timing of the rear wing group 21 is delayed by $\Delta T$ (=0.1 ms). Hence the resultant time data includes t=1/928, tf=3 ms and tr=3.1 ms. The evaluative operation in accordance with the flow chart shown in FIG. 9 is similar to that in the normal operation. However, the resultant time data, as described above, is displayed on the LCD 34, as shown in FIG. 16.

2. Maximum Shutter Speed Set to 1/8000 sec.:
(1) Normal Operation: Time Chart in FIG. 5:

The shutter operation in accordance with the flow chart shown in FIGS. 7 and 8 is similar to the normal operation in which the set time is 1/1000 sec. In the evaluative operation of the flow chart shown in FIG. 9, since T=1/8000 sec. in the step S32, the flow goes to the step S35. Similarly, the LCD 34 displays the corresponding data. However, since the detection accuracy of the shutter-curtain run detecting unit 37 is insufficient to the maximum speed of 1/8000 sec, it is meaningless to display the data t regarding the detected second without any change. For that reason, when the shutter speed is set to the maximum speed in seconds, the levels of the detection and the decision are lowered to a small value to decide whether the shutter has been opened (or an exposure operation has been performed), and then the resultant data is displayed. When the shutter in open (exposure operation completed) is detected, the count time display 34*b*, as shown in FIG. 17, displays "shutter opened" as second data "t". When the shutter is not opened, the situation is treated as the abnormal condition 1 to be described below.

(2) Malfunction of the Trailing Curtain (Refer to the Time Chart in FIG. 10):

This situation resembles the case where the leading curtain has been failed in the operation at the set time of 1/1000 sec. and is decided as the abnormal condition 1. The LCD 34 displays as the case shown in FIG. 14, (but the set second display 34*a* displays 1/8000 sec.).

(3) Malfunction of the Trailing Curtain:

This case corresponds to the operational failure of the trailing curtain set to a shutter time of 1/1000 sec. and is decided as the abnormal condition 2. The LCD 34 displays data as shown in FIG. 15 (in this case, the set shutter speed display 34*a* displays 1/8000 sec. and the tf display 34*c* displays data regarding tf).

(4) Erroneous Timing in Exposure Operation (Refer to the Time Chart in FIG. 12):

This case corresponds to the normal operation at the set shutter speed of 1/8000 sec. The LCD 34 displays data as shown in FIG. 17.

As described above, the shutter speed is varied from the maximum value to other values in accordance with the shutter speed detection level and the decision level. Where the shutter-curtain run detecting means 37 has a worse detection accuracy, the levels of the shutter speed detection and the decision can be lowered in accordance with the detection accuracy to set them to an arbitrary value. That is, the levels of the shutter speed detection and the decision can be varied in the lower shutter speed range (e.g. 1/4000 sec.). In this case, it is decided whether T≦1/4000 sec. in the step S32 shown in FIG. 9. If so, the flow goes to the step S35. If not so, the flow goes to the step S36. When a sufficient accuracy is obtained over all shutter speed ranges, it is possible to remove the steps S32 and S35.

FIG. 18 shows the example that the LCD 34 displays another information. The second error display 34*c* is used instead of the count time display 34*b*. The tf error display 34*f* is used instead of the tf display 34*c*. The tr error display 34*g* is used instead of the tr display 34*d*. Each display shows an error shifted from the standard value. The values calculated according to the following formulas are displayed:

Error in seconds=$\log_2$ (t/T)

tf error=tf (count value)−tf(standard value)

tr error=tr (count value)−tr (standard value)

FIG. 18 shows data obtained converting data displayed as shown in FIG. 16 using the above formulas. The error in second-may be displayed as (t−T) without displaying logarithmically. As described above, various displaying modes can be selected.

Figure 19:
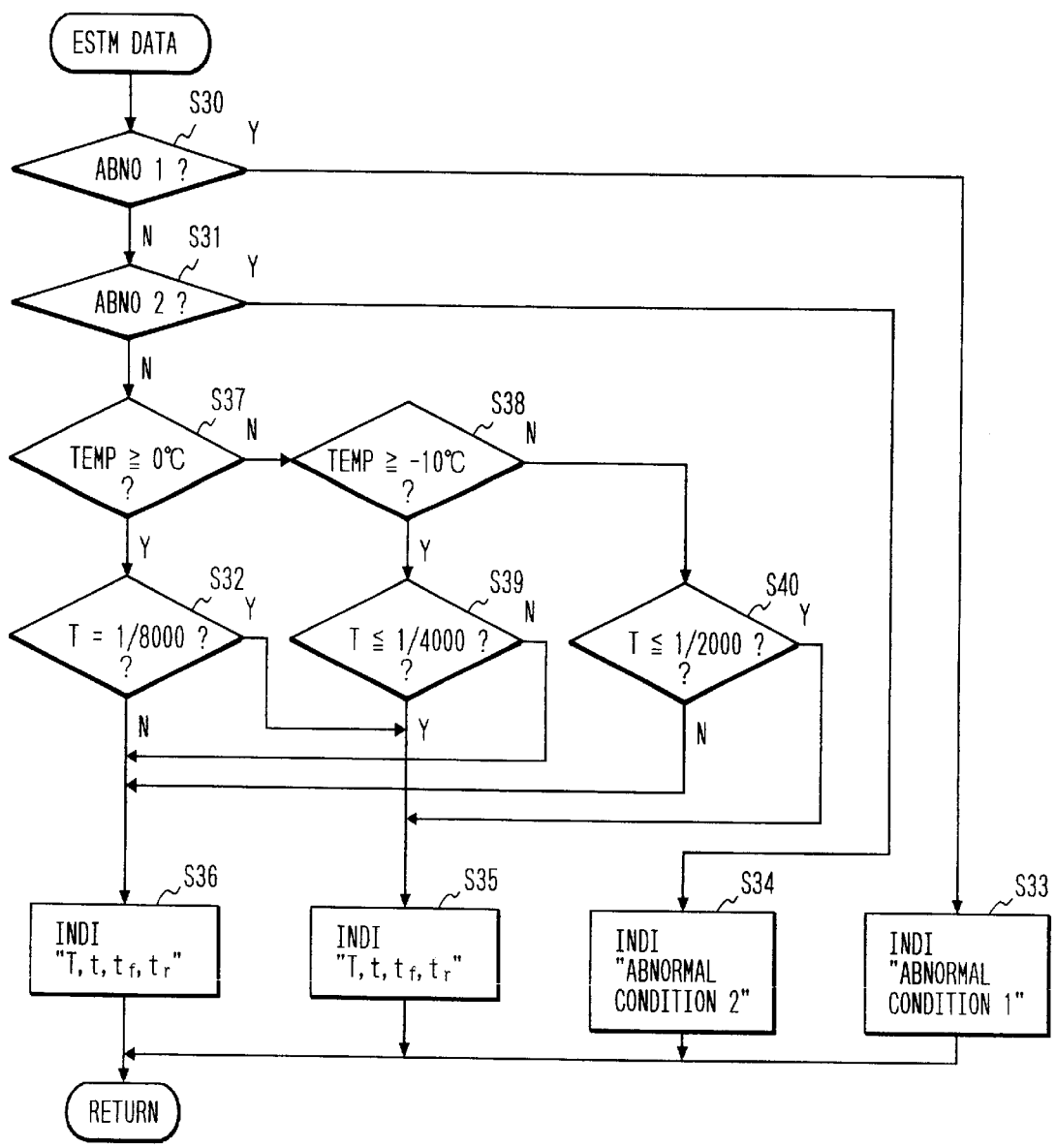
FIG. 19 shows a control CPU processing program used for the camera according to an embodiment of the present invention.

FIG. 19 shows another example of the evaluative routine. In the evaluative routine, the detection level at a high shutter speed is varied as the detection accuracy of the shutter-curtain run detecting unit 37 varies with temperature. For example, the evaluative routine is showed to the example where the detection accuracy of the shutter-curtain run detecting unit 37 becomes worse as the temperature drops.

The temperature sensor 42 can detect the temperature. In concrete, FIG. 19 shows the case where the detection accuracy of 1/8000 sec. is insufficient over temperatures of more than zero ° C. and more; the case where the detection accuracy at a high shutter speed of 1/4000 sec. is insufficient over temperatures ranging less than 0° C. to more than −10° C.; and the case where the detection accuracy at a high shutter speed of less than 1/2000 sec. is insufficient over temperatures of less than −10° C. In FIG. 19, the steps S37 and S38 for detecting temperatures as well as the steps S39 and S40 for deciding a set shutter speed T are added to the routine shown in FIG. 9. Other steps corresponds to the remaining steps shown in FIG. 9. Hence, the abnormal conditions 1 and 2 are dealt within the same process as that shown in FIG. 9. When the system is not in the abnormal conditions 1 and 2, the temperature decision is done in the step S37. The flow goes to the step S32 at 0° C. and more. The flow goes to the step S38 at less than 0° C. Then the temperature decision is repeated again in the step S38. Then the flow goes to the step S39 at −10° C. or more. If the temperature is less than −10° C., the flow goes to the step S40. Hence, when the temperature is more than 0° C., the flow goes to the step S32. When the temperature is less than 0° C. or more than 10° C., the flow goes to the step S39. When the temperature is less than −10° C., the flow goes to the step S40. The set shutter speed T is decided in each of the steps S32, S39 and S40. If the set shutter speed T is set to 1/8000 sec. in the step S32, the set shutter speed T is set to a high speed of less than 1/4000 sec. in the step S39, or the set shutter speed T is set to a high speed of less than 1/2000 sec. in the step S40, the flow goes to the step S35. Thus data is displayed on the display unit 34 as shown in FIG. 17. If the above conditions are not set, the flow goes to the step S36. Then data are displayed on the display unit 34 in accordance with the set time or the detection result, as shown any one of FIGS. 13, 16 and 18. The detection level can be varied in accordance with the shutter speed. For example, T=1/8000 sec. when the temperature is more than 0° C., T=1/4000 sec. when the temperature ranges from less than 0° C. to more than −10° C., and T=1/2000 sec. when the temperature is less than −10° C.

The above-mentioned configuration can vary the accuracy level for shutter time detection in accordance with temperature. The combination of temperature and detected time in second is an example. The accuracy level can be arbitrarily set in accordance with the detection accuracy with respect to the temperature of the shutter-curtain run detecting units 37.

As described above, according to the present embodiment, the camera with the shutter speed detecting means can evaluate the operation of the shutter and also can display the resultant data. The camera also can detect various abnormal conditions and also can display the resultant data. Furthermore, since the decision level of the shutter speed for inspection can be set to a desired value, an optimum inspection can be performed in accordance with the detection accuracy of the shutter-curtain run detecting means. Furthermore it is possible to consider a change in temperature of the detection accuracy of the shutter-curtain run detecting means. Since various display modes can be set, an optimum display mode can be select to meet the use purpose of a camera.

As described above, according to the present invention, the notification control means drives the shutter condition detecting means, based on both the shutter speed set by means of the shutter speed setting means and inherent data stored in memory means to inform a photographer of the result detected by the shutter condition detecting means.

Hence even if the detection accuracy of the detecting element is insufficient for the inspection shutter speed in seconds, a precise display can be provided to the photographer.

What is claimed is:

1. A camera, comprising:

a shutter to limit an exposure time of a recording medium;

a detector fixed to the camera to detect a running speed of a shutter curtain;

a manifesting unit to manifest a result detected by said detector in such a way that a user can discriminate the detected result;

a memory to store information regarding the running speed of the shutter curtain; and a comparator to compare said stored information with the result detected by said detector, wherein said memory stores a predetermined running speed of the shutter curtain, said comparator compares said detected running speed of the shutter curtain with said predetermined running speed of the shutter curtain, and said manifesting unit performs an informing operation based on a result of the comparison and includes a display unit that displays a result of said comparison.

2. A camera comprising:

a shutter to limit an exposure time of a recording medium;

a detector fixed to the camera to detect the operational condition of said shutter;

a manifesting unit to manifest a result detected by said detector in such a way that a user can discriminate the detected result;

an environmental sensor to detect an environmental condition around said camera; and a manifesting unit controller to switch an information mode of said manifesting unit, based on a result detected by said environmental sensor.

3. The camera according to claim 2, wherein said environmental sensor detects a temperature around said camera.

* * * * *